United States Patent
De Ceuster

(10) Patent No.: US 6,517,136 B2
(45) Date of Patent: Feb. 11, 2003

(54) REMOVABLE ELECTRICALLY POWERED CAR CARGO-SPACE COVER

(75) Inventor: Peter De Ceuster, Itegem (BE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 10/101,472

(22) Filed: Mar. 19, 2002

(65) Prior Publication Data

US 2002/0135195 A1 Sep. 26, 2002

(30) Foreign Application Priority Data

Mar. 20, 2001 (DE) ........................... 101 13 616

(51) Int. Cl.[7] .............................. B60R 5/04
(52) U.S. Cl. ............... 296/37.16; 296/37.1; 160/24; 160/DIG. 2
(58) Field of Search ............... 296/37.16, 98, 296/100.18, 100.15, 100.13, 100.11, 37.1, 37.8; 160/265, 266, 270, 272, 273.1, 311, DIG. 2, DIG. 10, 24, 370.22, 84.06

(56) References Cited

U.S. PATENT DOCUMENTS

| | | | | |
|---|---|---|---|---|
| 4,795,206 A | * | 1/1989 | Adams | 296/98 |
| 5,538,306 A | * | 7/1996 | Ament | 296/37.16 |
| 5,630,460 A | * | 5/1997 | Yuan | 296/24.1 |
| 5,653,278 A | * | 8/1997 | Cheng | 160/24 |
| 6,003,920 A | * | 12/1999 | Crisp | 296/37.1 |
| 6,039,105 A | * | 3/2000 | Patmore et al. | 160/24 |
| 6,213,186 B1 | * | 4/2001 | Torres et al. | 160/24 |
| 6,276,753 B1 | * | 8/2001 | Sur et al. | 297/188.19 |
| 6,349,986 B1 | * | 2/2002 | Seel et al. | 296/37.16 |
| 6,416,103 B1 | * | 7/2002 | Laudenbach et al. | 296/37.1 |
| 2001/0017194 A1 | * | 8/2001 | Schlecht et al. | 160/370.22 |

FOREIGN PATENT DOCUMENTS

| | | |
|---|---|---|
| DE | 42 00 021 | 7/1993 |
| DE | 196 26 582 | 1/1998 |
| DE | 19626582 | 1/1998 |
| DE | 197 54 223 | 6/1999 |

* cited by examiner

*Primary Examiner*—D. Glenn Dayoan
*Assistant Examiner*—Jason Morrow
(74) *Attorney, Agent, or Firm*—Herbert Dubno; Andrew Wilford

(57) ABSTRACT

A cargo-space cover for a motor vehicle has a fitting permanently mounted in the motor vehicle and a housing having an end cap complementarily fittable in a seat of the fitting. A shaft rotatable in the housing carries a cover sheet windable by a drive motor in the housing on the shaft. A pair of contacts fixed and exposed in the seat and connectable to power circuitry are engageable with a complementary pair of contacts fixed on and exposed at the end cap and positioned so as to engage the respective seat contacts when the end cap is fitted to the seat to connect the motor via the two pairs of contacts to the power circuitry. A latch retains the end cap in the seat with the end-cap contacts in solid contact with the seat contacts.

7 Claims, 2 Drawing Sheets

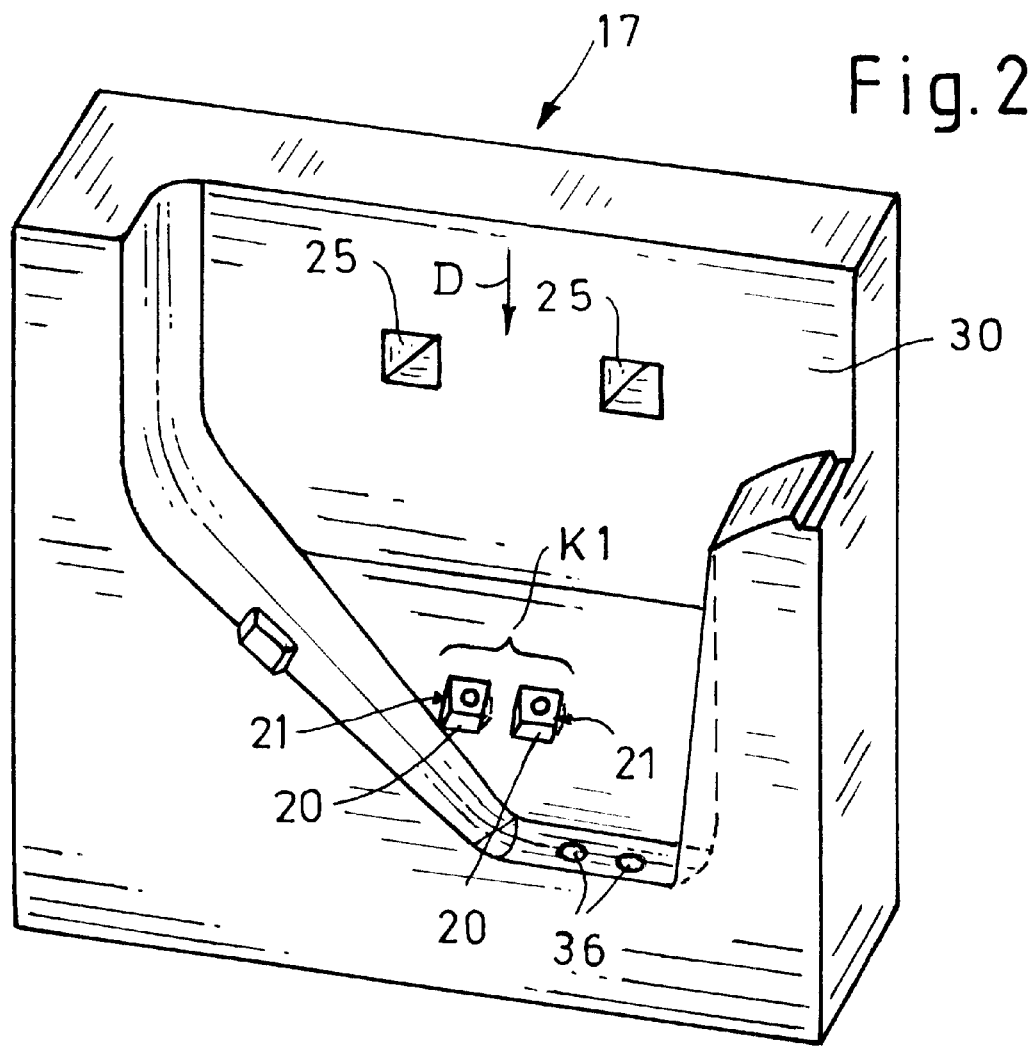
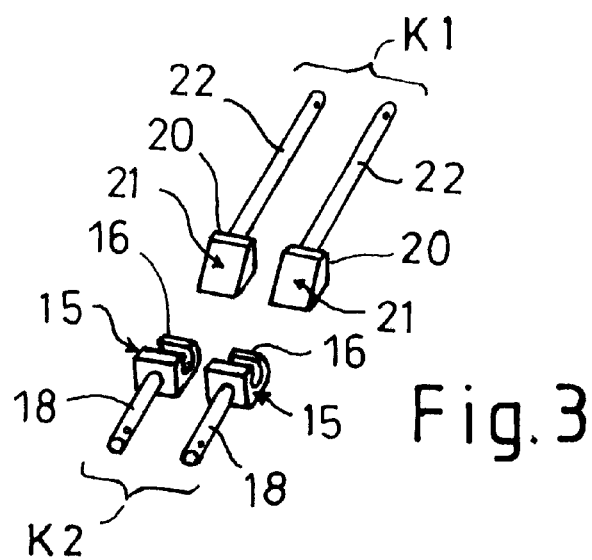

REMOVABLE ELECTRICALLY POWERED CAR CARGO-SPACE COVER

FIELD OF THE INVENTION

The present invention relates to a motor-vehicle cargo-space cover. More particularly this invention concerns a removable electrically powered cover for a cargo space of a station wagon or the like.

BACKGROUND OF THE INVENTION

A cargo-space cover for a motor vehicle typically has a housing having an end cap, a shaft rotatable in the housing, and a cover sheet connected to the shaft and windable thereon. A drive motor in the housing is connected to the sheet to unwind it from the shaft and pay it out over the cargo space and to wind it up on the shaft and retract it into the housing. This system is described in German patent document 42 00 021 of P. Butz.

In German patent document 196 26 582 of E. Ament such a cover is used in a station wagon and is provided with a mechanical link to the rear hatch so that it is retracted when the hatch is opened. To this end, opening the hatch loads a spring whose force is employed to retract and wind up the cover sheet, constituted as a net.

Similarly the system of German patent document 197 54 223 of O. Andronis has a complex mechanism involving a pair of bulky arms that are permanently mounted in the vehicle and flank the cargo space. These arms contain mechanism for paying out and retracting the cover sheet.

A common problem with these units, especially when used in a station wagon, is that they cannot be gotten out of the way easily. The transverse housing holding the shaft on which the sheet is wound is normally semipermanently mounted at the front end of the cargo space directly behind the back seat so that, when the sheet is retracted, the space is wide open from the back. If, however, the back seat is folded forward to maximize cargo capacity, this housing constitutes a bar blocking the space.

Making the housing removable is technically possible and in fact common for standard manual units. For a powered unit this is a substantially greater problem that has not been satisfactorily solved.

OBJECTS OF THE INVENTION

It is therefore an object of the present invention to provide an improved motor-vehicle cargo-space cover.

Another object is the provision of such an improved motor-vehicle cargo-space cover which overcomes the above-given disadvantages, that is which is self-powered with a motor in the housing, but which can readily be removed and reinstalled.

SUMMARY OF THE INVENTION

A cargo-space cover for a motor vehicle has according to the invention a fitting permanently mounted in the motor vehicle and forming a seat and a housing having an end cap complementarily fittable in the seat. A shaft rotatable in the housing carries a cover sheet. A drive motor in the housing connected to the sheet can unwind it from the shaft and pay it out over the cargo space and can wind it up on the shaft and retract it into the housing. In accordance with the invention a pair of contacts fixed and exposed in the seat and connectable to power circuitry are engageable with a complementary pair of contacts fixed on and exposed at the end cap and positioned so as to engage the respective seat contacts when the end cap is fitted to the seat to connect the motor via the two pairs of contacts to the power circuitry. A latch retains the end cap in the seat with the end-cap contacts in solid contact with the seat contacts.

Thus the entire powered unit, including the motors that pay out and retract the cover sheet, can be lifted out and installed in the vehicle as simply as a simple nonpowered unit. The latches not only make the system more stable and prevent it from shaking out of its seats during bumpy travel, but ensure constant connection to the motor of the control and power circuitry in the vehicle so that the system will always operate. In the simplest system the contacts merely supply direct-current power to a reversible motor, and in more complex systems they also transmit control signals from sensors in the housing.

The seat contacts fit complementarily with the respective end-cap contacts. They can be a simple plug/jack connection. Alternately, the contacts of one of the pairs each have an elastically deformable part engageable with the respective contacts of the other of the pairs. Normally the one pair is the end-cap pair and the deformable parts project past an end surface of the end cap and are pressed elastically inward when engaged with the contacts of the other pair.

The seat and end cap according to the invention are fittable together in a predetermined direction and have confronting surfaces extending at an acute angle to the direction and carrying the respective contact pairs. Furthermore the seat and end cap are fittable together in a predetermined direction and the latch includes a bolt carried in the housing and a keeper pocket formed in the seat for preventing relative movement of the seat and end cap in the direction when the bolt is engaged in the pocket.

BRIEF DESCRIPTION OF THE DRAWING

The above and other objects, features, and advantages will become more readily apparent from the following description, reference being made to the accompanying drawing in which:

FIG. 2 is a perspective side view of one of the end mounts according to the invention; and FIG. 3 is an exploded view illustrating the contacts.

SPECIFIC DESCRIPTION

Figure 1:
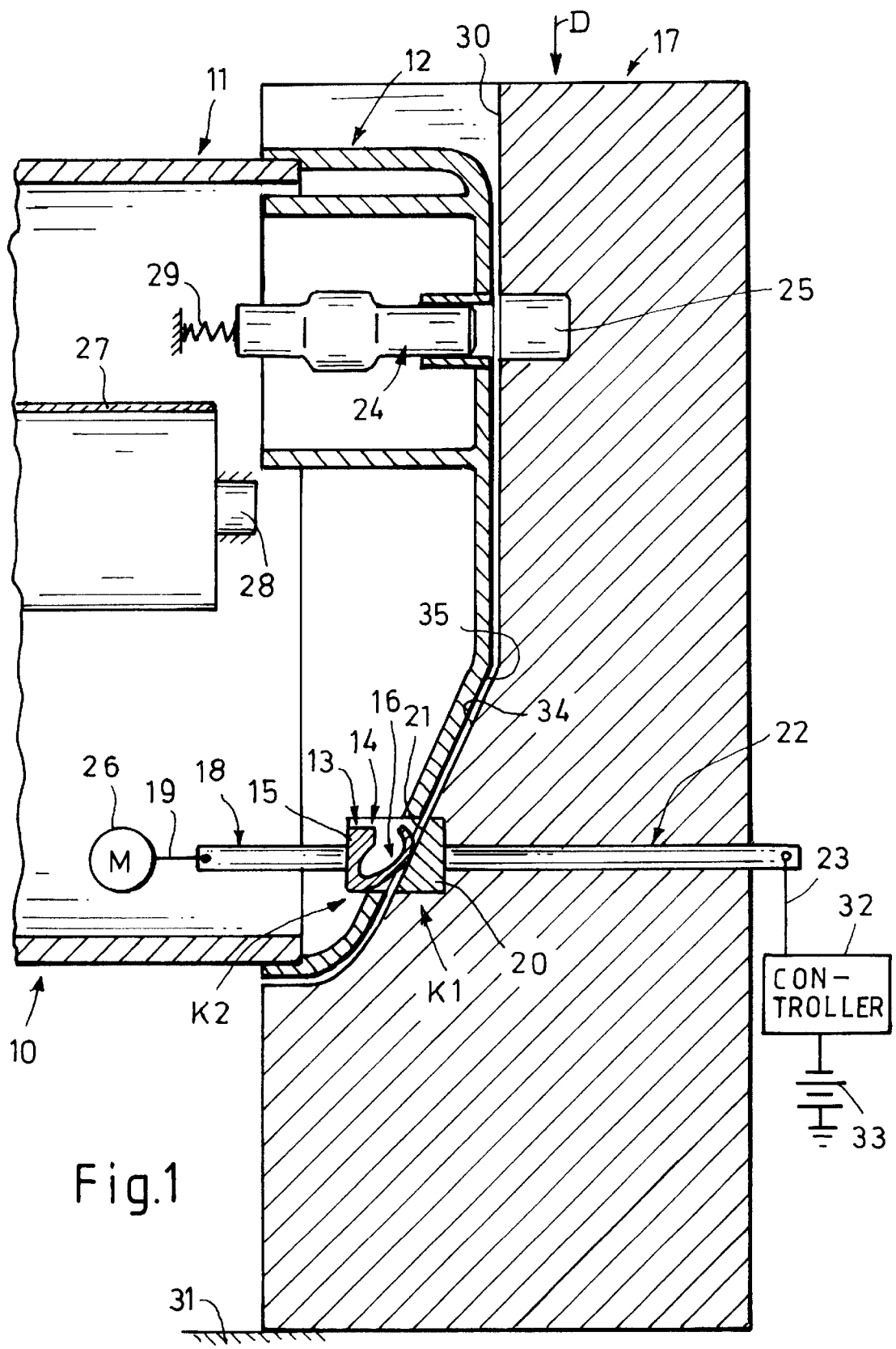
FIG. 1 is a large-scale section through an end of a motor-vehicle cargo-space cover in accordance with the invention.

As seen in FIG. 1 a cover 10 according to the invention has a housing 11 elongated in a direction (here horizontal and parallel to the plane of view) perpendicular to the normal vehicle travel direction and provided with a pair of identical end caps 12 of which one is shown. The housing 11 can hold a cover sheet 27 wound on a shaft 28 and is provided with one or more reversible electric motors 26 that pay out and retract the sheet 27 for instance as described in copending U.S. patent application 10/099,884.

The housing end caps 12 fit in seats 30 of fittings 17 (one shown in FIG. 2) that are permanently secured to a car body illustrated schematically at 31. The seats 30 are generally upwardly V-shaped opposite to an insertion direction D, like the end caps 12, so that the end caps 12 are solidly held when fitted in the direction D to these seats 30. In addition each end cap 12 has two latch bolts 24 urged outward by respective springs 29 and engageable in horizontally inwardly open pockets 25 formed in the outer wall of the respective seat 30. These bolts 24 can be retracted manually inward to free the cover 10, but when extended lock the housing 11 solidly in place in the fittings 17 as they prevent movement of the housing 11 upward opposite the insertion direction D, all other movement being blocked by the seats 30.

A controller 32 in the car is connected to a power source 33 and serves to operate the reversible motor(s) 26 in the cover 10. To this end, the fitting 17 carries a pair K1 of contacts 20 and the end cap 12 carries a pair K2 of contacts 15. Each contact 15 has a lead 18 connected via wiring 19 to the motor(s) 26 and each contact 20 has a lead 22 connected via wiring 23 to the controller 32 and a head 14 set in a recess 13 in a wall 35 of the end cap 12. The contacts 20 have heads 21 that are set in an angled wall 34 of the seat 30 with faces flush with this wall 34 so that these faces are directed horizontally inward and also somewhat upward. The complementarily downwardly angled outer face 35 of the respective end cap 12 fits flush against the face 34, but the contacts heads 14 are each formed with a flexible bow-shaped outer contact arm 16 that projects somewhat outward past the plane of the face 35. In this manner as the cover 10 is set in place in the fittings 17, the arms 16 will engage downward and outward against the faces of the contacts 20 and make a solid electrical contact, even scraping off any minor oxidation that might have formed. Since the housing 11 is latched in place by the bolts 24, good electrical contact will be ensured.

FIG. 2 also illustrates how a pair of jacks 36 can be provided in the floor of the seat 30 for connection of a plug or similar connector carried on the respective end cap 12. Such connection could be instead of or in addition to the two contact pairs K1 and K2.

I claim:

1. A cargo-space cover for a motor vehicle, the cover comprising:
    a fitting permanently mounted in the motor vehicle and forming a seat;
    a housing having an end cap complementarily fittable in the seat;
    a shaft rotatable in the housing;
    a cover sheet connected to the shaft and windable thereon;
    drive means including a electrical load in the housing connected to the sheet for unwinding it from the shaft and paying it out over the cargo space and for winding it up on the shaft and retracting it into the housing;
    a pair of contacts fixed and exposed in the seat and connectable to power circuitry;
    a complementary pair of contacts fixed on and exposed at the end cap and positioned so as to engage the respective seat contacts when the end cap is fitted to the seat to connect the electrical load via the two pairs of contacts to the power circuitry; and
    latch means for retaining the end cap in the seat with the end-cap contacts in solid contact with the seat contacts.

2. The motor-vehicle cargo-space cover defined in claim 1 wherein the seat contacts fit complementarily with the respective end-cap contacts.

3. The motor-vehicle cargo-space cover defined in claim 1 wherein the contacts of one of the pairs each have an elastically deformable part engageable with the respective contacts of the other of the pairs.

4. The motor-vehicle cargo-space cover defined in claim 3 wherein the one pair is the end-cap pair.

5. The motor-vehicle cargo-space cover defined in claim 3 wherein the deformable parts project past an end surface of the end cap and are pressed inward when engaged with the contacts of the other pair.

6. The motor-vehicle cargo-space cover defined in claim 1 wherein the seat and end cap are fittable together in a predetermined direction and have confronting surfaces extending at an acute angle to the direction and carrying the respective contact pairs.

7. The motor-vehicle cargo-space cover defined in claim 1 wherein the seat and end cap are fittable together in a predetermined direction and the latch means includes a bolt carried in the housing and a keeper pocket formed in the seat for preventing relative movement of the seat and end cap in the direction when the bolt is engaged in the pocket.

* * * * *